United States Patent Office 2,775,735
Patented Dec. 25, 1956

2,775,735

DEVICE FOR REDUCING THE NO-LOAD VOLTAGE OF A VOLTAGE SOURCE USED IN ARC-WELDING

Frans Hendrik de Jong and Dirk Willem van Rheenen, Eindhoven, Netherlands, assignors to Hartford National Bank and Trust Company, Hartford, Conn., as trustee Application June 11, 1953, Serial No. 360,884

Claims priority, application Netherlands July 8, 1952

5 Claims. (Cl. 323—60)

The present invention relates to welding circuits. More particularly, the invention relates to a device for reducing the no-load voltage of a voltage source used in arc-welding, in which the welding circuit comprises an impedance for the said voltage reduction. The impedance is adapted to be short-circuited via the contacts of a first relay, the contacts of this relay being open in its de-energized condition. The excitation winding of the first relay is connected to the voltage source via contacts which are closed in the de-energized condition of a second relay, whereas the excitation winding of the second relay is connected to the welding conductors. A device of this type is known from Dutch patent specification 69,188.

According to the invention, the second relay in a device of the aforesaid type has a retarded building time so that its response to the high no-load voltage is delayed. Said relay is so constructed as to remain energized at the reduced voltage with open contacts of the first-mentioned relay then de-energized, whereas in contradistinction thereto it falls off rapidly upon contact being made between the welding electrode and the workpiece for striking the arc and it does not respond to the arc voltage.

This produces the advantage that, if the arc is abruptly interrupted in an undesired manner, the second relay does not respond immediately as a result of the retarded building time and energization of the first relay is interrupted, due to which the contacts of the first relay would open and the voltage-reducing impedance would be connected in circuit so that the arc could not be struck.

On the other hand the delay in building time of the relay is not such that upon switching on the lines voltage the dangerous open voltage is applied to the welding electrode too long. As a rule, a delay time of at most 1 second is deemed permissible.

The device according to the invention has the additional advantage of being adapted to be connected directly to the welding terminals so that no modifications need be provided on the primary side of the welding device. In this manner the device is not only suitable for use with welding transformers, but also with welding rectifiers, welding devices comprising central supply transformers, and even with converters.

A further advantage is that the relays respond only to the voltage and not to the current.

Figure 1:
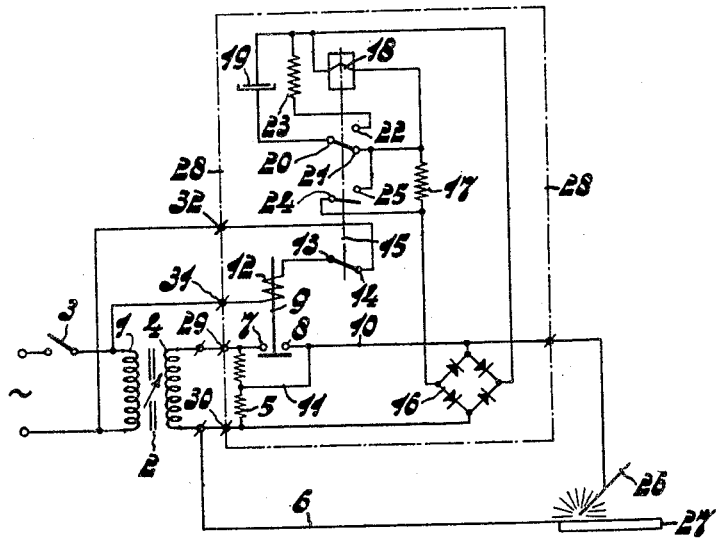
Figure 2:
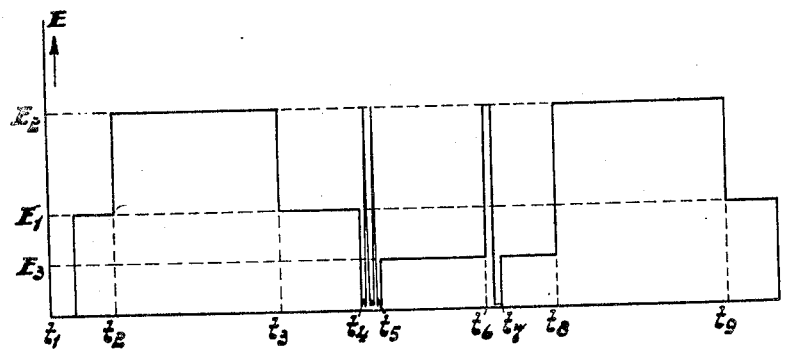

In order that the invention may be readily carried into effect, it will now be described with reference to the accompanying drawing, wherein:

Fig. 1 is a schematic diagram of an embodiment of the welding circuit of the present invention; and Fig. 2 is a graphical presentation of the relative voltages across the welding conductors of Fig. 1 at various intervals of time.

In Fig. 1, the primary winding 1 of a welding transformer 2 is adapted to be connected to supply lines via a switch 3. The secondary winding 4 is shunted by a potentiometer 5, one end of which is connected to a welding conductor 6 and the other end of which is connected via contacts 7 and 8 of a first relay 9 to another welding conductor 10 and, moreover, to a tapping line 11 on the potentiometer 5 if the contacts 7 and 8 are shunted. The relay 9 comprises an excitation winding 12 which is connected to the supply lines via contacts 13 and 14 associated with a second relay 15. The contacts 13 and 14 are shunted in the de-energized condition of the second relay 15, as in Fig. 1. Connected to the welding conductors 6 and 10 is a rectifier 16 which supplies voltage across a resistor 17 to the excitation winding 18 of the second relay 15. In parallel with the excitation winding 18 is connected, via contacts 20 and 21, a capacitor 19 adapted to be discharged via contacts 20, 22, and a resistor 23 when the energized condition of the second relay 15 occurs. The resistor 17 is adapted to be short-circuited via contacts 24 and 25 when the energized condition of the second relay 15 occurs.

The operation of the welding circuit of the present invention may be explained with reference to Fig. 2.

If the switch 3 is closed at an instant $t_1$ the excitation winding 12 of the relay 9 is energized. Due to the normal inertia of the relay 9 the contacts 7 and 8 will be closed at the instant $t_2$. Between the instants $t_1$ and $t_2$ a reduced voltage $E_1$ equal to the portion of the potentiometer voltage between lines 6 and 11 is set up across the welding conductors 6 and 10. At the instant $t_2$ the upper part of the potentiometer 5 is short-circuited so that the voltage between the welding conductors 6 and 10 rises to a high secondary no-load voltage $E_2$. The voltage $E_2$ is rectified by the rectifier 16 and supplied via the resistor 17 to the excitation winding 18 and the parallel-connected capacitor 19 of the relay 15. Due to the combination of the resistor 23 and the capacitor 19, the relay 15 has a retarded building time, such as, for example 0.8 second so that it will respond only at the instant $t_3$. As a rule, a laspe of time of 0.8 (to 1) second between the instants $t_2$ and $t_3$, during which the full voltage $E_2$ is set up at the welding conductors 6 and 10, is generally deemed permissible. Upon response of the relay 15, the contacts 13, 14 open and contacts 24, 25 and 20, 22 are closed. This results in the dropping of the relay 9 at the instant $t_3$ (assuming the dropping time of said relay to be negligible) so that the secondary voltage again drops to the value $E_1$ due to the potentiometer 5 being again connected in circuit. Also, the resistor 17 is short-circuited and the capacitor 19 is discharged via the resistor 23, thus removing the artificial delay of the relay 15. The relay 15, however, remains energized even at the reduced voltage $E_1$. At the instant $t_4$ the welding electrode 26 is brought into contact with the workpiece 27 so that the secondary voltage is short-circuited and consequently acquires a very low value, with the result that the relay 15, which is no longer delayed, is very rapidly de-energized and, the condition illustrated in Fig. 1 is restored with respect to said relay. The capacitor 19 is again connected in parallel with the winding 18, the series resistor 17 is connected in circuit (hence the relay 15 is again brought into the retarded condition) and the winding 12 is energized so that the contacts 7 and 8 are shunted and the full secondary voltage $E_2$ is available for welding, hence the arc may be struck. If the arc does not strike on lifting the electrode for the first time the workpiece may again be struck; a high voltage $E_2$ remaining available, since the relay 9 remains energized for approximately 1 second after each contact. Due to repeated contact between the welding electrode 26 and the workpiece 27 during the period $t_4$ to $t_5$ the welding arc will, for example, be struck at the instant $t_5$, the voltage then dropping to the arc voltage $E_3$. At this low voltage the relay 15 still remains dropped as in Fig. 1. If the welding arc extinguishes abruptly and the high secondary no-load voltage $E_2$ reappears, a time of approximately 0.8 second is available for the welder to strike the arc again, it having been assumed above that the retarded relay 15 requires said time for building up. The arc will, for example, be struck again at the instant $t_7$.

If the welder stops welding at the instant $t_8$, the high no-load voltage $E_2$ reappears. After approximately 0.8 second this voltage drops again to the harmless reduced voltage $E_1$ at the instant $t_9$ due to energization of the relay 15 and de-energization of the relay 9 as a result of opening of the contacts 13, 14 and consequently of the contacts 7, 8.

The device may be housing in a casing 28 (Fig. 1) and has the advantage that the welding device need not be modified on the primary side of the welding transformer, since the terminals 29 and 30 are connected to the welding voltage (also from a rectifier or a converter) and the terminals 31 and 32 are connected to the line voltage, thus obtaining a standard apparatus.

While the invention has been described by means of a specific example and in a specific embodiment, we do not wish to be limited thereto, for obvious modifications will occur to those skilled in the art without departing from the spirit and scope of the invention.

What is claimed is:

1. A welding circuit operating at a predetermined arc voltage and having a device for reducing its no-load voltage comprising a pair of welding conductors coupled to a voltage source, an impedance connected to said voltage source for providing a reduced voltage to said conductors, a first relay having an excitation winding and a pair of contact points, said contact points being connected to short-circuit at least a part of said impedance in the energized condition of said relay, and a second relay having an excitation winding and a pair of contact points, means for connecting the excitation winding of said first relay to said voltage source through the contact points of said second relay, said last-mentioned contact points being closed in the non-energized condition of said second relay, means for connecting the excitation winding of said second relay to said welding conductors, and means for retarding the energization building up response time of said second relay to said no-load voltage, said second relay being energizable at said reduced voltage and being non-energizable at said arc voltage.

2. A welding circuit, as set forth in claim 1, further including an arc-welding transformer having a primary winding and a secondary winding interposed between said pair of welding conductors and the source of voltage, said impedance being connected to said secondary winding and the excitation winding of said first relay being connected to said primary winding.

3. A welding circuit comprising a pair of welding conductors coupled to a voltage source, an impedance connected to said voltage source for providing a reduced voltage to said conductors, a first relay having an excitation winding and a pair of contact points, said pair of contact points being connected to short-circuit at least a part of said impedance in the energized condition of said relay, a second relay having an excitation winding and a plurality of pairs of contact points, means for connecting the excitation winding of said first relay to said voltage source through a first pair of said plurality of pairs of contact points, and means for retarding the response of said second relay to the no-load voltage of said circuit comprising rectifying means having an input circuit connected to said conductors and an output circuit, means for coupling said output circuit to the excitation winding of said second relay, a capacitor, means for connecting said capacitor in parallel combination with the excitation winding of said second relay through a second pair of said plurality of pairs of contact points, said first and second pairs of contact points being closed in the non-energized condition of said second relay and a resistor included in said output circuit coupling means in series connection with said parallel combination, said welding circuit operating at a predetermined arc voltage and said second relay being energizable at a reduced no-load voltage of said welding circuit and being non-energizable at said arc voltage.

4. A welding circuit comprising a pair of welding conductors coupled to a voltage source, an impedance connected to said voltage source for providing a reduced voltage to said conductors, a first relay having an excitation winding and a pair of contact points, said pair of contact points being connected to short-circuit at least a part of said impedance in the energized condition of said relay, a second relay having an excitation winding and a plurality of pairs of contact points, means for connecting the excitation winding of said first relay to said voltage source through a first pair of said plurality of pairs of contact points, and means for retarding the response of said second relay to the no-load voltage of said circuit comprising rectifying means having an input circuit connected to said conductors and an output circuit, means for coupling said output circuit to the excitation winding of said second relay, a capacitor, means for connecting said capacitor in parallel combination with the excitation winding of said second relay through a second pair of said plurality of pairs of contact points, said first and second pairs of contact points being closed in the non-energized condition of said second relay, a first resistor included in said output circuit coupling means in series connection with said parallel combination, means for short-circuiting said first resistor through a third pair of said plurality of pairs of contact points, a second resistor and means for discharging said capacitor across said second resistor through a fourth pair of said plurality of pairs of contact points, said third and fourth pairs of contact points being closed in the energized condition of said second relay, said welding circuit operating at a predetermined arc voltage and said second relay being energizable at a reduced no-load voltage of said welding circuit and being non-energizable at said arc voltage.

5. A welding circuit comprising a pair of welding conductors coupled to a voltage source, an impedance comprising a potentiometer connected in parallel with said voltage source for providing a reduced voltage to said conductors, said potentiometer having two ends and a tapping point, one end of said potentiometer being connected to one of said conductors, a first relay having an excitation winding and a pair of contact points, means for connecting the other end of said potentiometer to the other of said conductors through said pair of contact points, means for connecting said tapping point to said other conductor, a second relay having an excitation winding and a plurality of pairs of contact points, means for connecting the excitation winding of said first relay to said voltage source through a first pair of said plurality of pairs of contact points, and means for retarding the response of said second relay to the no-load voltage of said circuit comprising rectifying means having an input circuit connected to said conductors and an output circuit, means for coupling said output circuit to the excitation winding of said second relay, a capacitor, means for connecting said capacitor in parallel combination with the excitation winding of said second relay through a second pair of said plurality of pairs of contact points, said first and second pairs of contact points being closed in the non-energized condition of said second relay, a first resistor included in said output circuit coupling means in series connection with said parallel combination means for short-circuiting said first resistor through a third pair of said plurality of pairs of contact points, a second resistor and means for discharging said capacitor across said second resistor through a fourth pair of said plurality of pairs of contact points, said third and fourth pairs of contact points being closed in the energized condition of said second relay, said welding circuit operating at a predetermined arc voltage and said second relay being energizable at a reduced no-load voltage of said welding circuit and being non-energizable at said arc voltage.

References Cited in the file of this patent

UNITED STATES PATENTS

| | | |
|---|---|---|
| 2,444,168 | Mulder | June 29, 1948 |
| 2,449,456 | Croco et al. | Sept. 14, 1948 |